(12) United States Patent
Nozawa

(10) Patent No.: US 12,044,571 B2
(45) Date of Patent: Jul. 23, 2024

(54) AUTOFOCUSING METHOD, SPECTROSCOPIC CAMERA, AND COMPUTER PROGRAM

(71) Applicant: SEIKO EPSON CORPORATION, Tokyo (JP)

(72) Inventor: Takeshi Nozawa, Fujimi-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 227 days.

(21) Appl. No.: 17/805,922

(22) Filed: Jun. 8, 2022

(65) Prior Publication Data

US 2022/0397456 A1    Dec. 15, 2022

(30) Foreign Application Priority Data

Jun. 14, 2021   (JP) ................. 2021-098574

(51) Int. Cl.
*G01J 3/28*        (2006.01)
*G01J 3/02*        (2006.01)

(52) U.S. Cl.
CPC ........... *G01J 3/2803* (2013.01); *G01J 3/0229* (2013.01); *G01J 3/0237* (2013.01)

(58) Field of Classification Search
CPC ....... G01J 3/2803; G01J 3/0229; G01J 3/0237
See application file for complete search history.

(56) References Cited

U.S. PATENT DOCUMENTS 10,887,505 B2 *   1/2021   Hu ................. G02B 7/365
2021/0377502 A1 * 12/2021   Sano ............... H04N 9/3158

FOREIGN PATENT DOCUMENTS

JP        2004280048 A     10/2004

* cited by examiner

*Primary Examiner* — Edmond C Lau
*Assistant Examiner* — Mohamed Doumbia
(74) *Attorney, Agent, or Firm* — Pramod Chintalapoodi

(57) ABSTRACT

An autofocusing method includes causing light having n wavelengths different from one another to sequentially pass through a spectral filter and acquiring n image frames corresponding to the n wavelengths, n being an integer greater than or equal to two, selecting a wavelength corresponding to the image frame having the largest statistical value from the n image frames, the statistical value being one of the average, median, and mode of class values of pixels contained in a first region out of entire measurement pixels in each of the image frames, and determining a focusing point in a second region wider than the first region out of the entire measurement pixels while causing the light having the selected wavelength to pass through the spectral filter.

8 Claims, 6 Drawing Sheets

AUTOFOCUSING METHOD, SPECTROSCOPIC CAMERA, AND COMPUTER PROGRAM

The present application is based on, and claims priority from JP Application Serial Number 2021-098574, filed Jun. 14, 2021, the disclosure of which is hereby incorporated by reference herein in its entirety.

BACKGROUND

1. Technical Field

The present disclosure relates to an autofocusing method, a spectroscopic camera, and a computer program.

2. Related Art

For example, JP-A-2004-280048 discloses a contrast-based camera apparatus that performs focus adjustment by performing focus control in such a way that the range between the upper and lower ends of the contrast of an image of a subject is maximized, and then captures an image of the subject.

The camera apparatus described in JP-A-2004-280048 can produce R (red), G (green), and B (blue) photometric data in a single frame, but a spectroscopic camera using a variable filter needs to set a single wavelength on a frame basis, perform spectrometric measurement, and repeat the setting and measurement for the number of wavelengths required, and therefore has a problem of time-consuming focus adjustment.

SUMMARY

An autofocusing method including causing light having n wavelengths different from one another to sequentially pass through a spectral filter and acquiring n image frames corresponding to the n wavelengths, n being an integer greater than or equal to two, selecting a wavelength corresponding to the image frame having the largest statistical value from the n image frames, the statistical value being one of an average, a median, and a mode of class values of pixels contained in a first region out of entire measurement pixels in each of the image frames, and determining a focusing point in a second region wider than the first region out of the entire measurement pixels while causing light having the selected wavelength to pass through the spectral filter.

A spectroscopic camera includes a spectral filter and a control section, and the control section carries out processes including causing light having n wavelengths different from one another to sequentially pass through a spectral filter and acquiring n image frames corresponding to the n wavelengths, n being an integer greater than or equal to two, selecting a wavelength corresponding to the image frame having the largest statistical value from the n image frames, the statistical value being one of an average, a median, and a mode of class values of pixels contained in a first region out of entire measurement pixels in each of the image frames, and determining a focusing point in a second region wider than the first region out of the entire measurement pixels while causing light having the selected wavelength to pass through the spectral filter.

A non-transitory computer-readable medium storing a computer program includes causing light having n wavelengths different from one another to sequentially pass through a spectral filter and acquiring n image frames corresponding to the n wavelengths, n being an integer greater than or equal to two, selecting a wavelength corresponding to the image frame having the largest statistical value from the n image frames, the statistical value being one of an average, a median, and a mode of class values of pixels contained in a first region out of entire measurement pixels in each of the image frames, determining a focusing point in a second region wider than the first region out of the entire measurement pixels while causing light having the selected wavelength to pass through the spectral filter, and storing the focusing point in a storage device.

DESCRIPTION OF EXEMPLARY EMBODIMENTS

The configuration of a smartphone 100 equipped with a spectroscopic camera 10 will first be described with reference to FIGS. 1 and 2.

Figure 1:
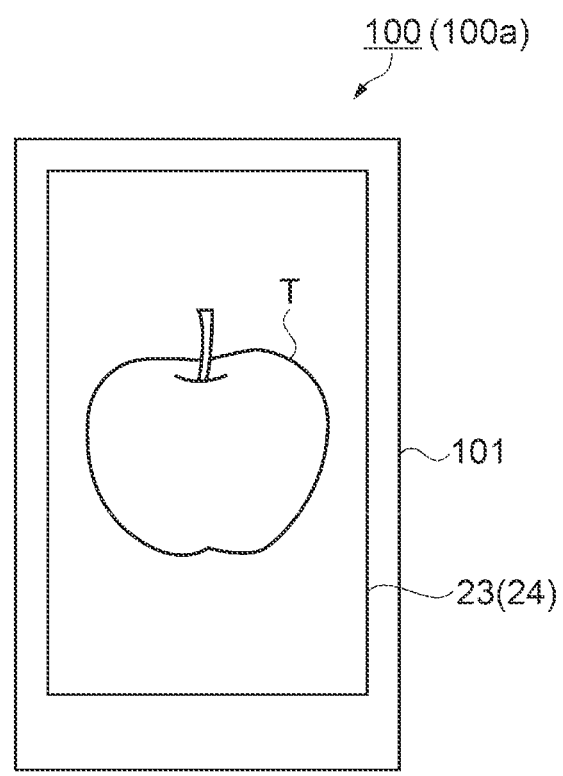
FIG. 1 is a plan view showing the configuration of a front surface of a smartphone.

A front surface 100a of the smartphone 100 has a display section 23 provided as part of an enclosure 101, as shown in FIG. 1. The display section 23 is, for example, a liquid crystal display or an organic EL display, and has both display and input functions. The display section 23 displays an image containing information on an identified measurement target T.

The input function is a function performed by an input section 24 (see FIG. 3), which will be described later. The input section 24 is provided, for example, at the front surface of the display section 23 and formed of a touch panel including a touch sensing surface and a sensor that detects the intensity of contact with the touch sensing surface.

Figure 2:
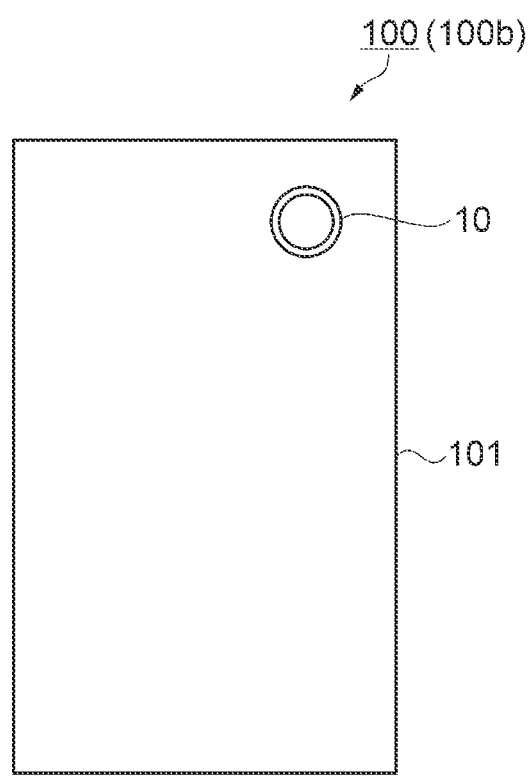
FIG. 2 is a plan view showing the configuration of a rear surface of the smartphone.

A rear surface 100b of the smartphone 100 has the spectroscopic camera 10 provided as part of the enclosure 101, as shown in FIG. 2. The spectroscopic camera 10 includes a spectrometer 12 (see FIGS. 3 and 4) that performs spectrometric measurement with the transmission wavelength band sequentially changed, and captures images of the measurement target T at sensitivities in a plurality of wavelength bands.

The configuration of the smartphone 100 will next be described with reference to FIG. 3.

Figure 3:
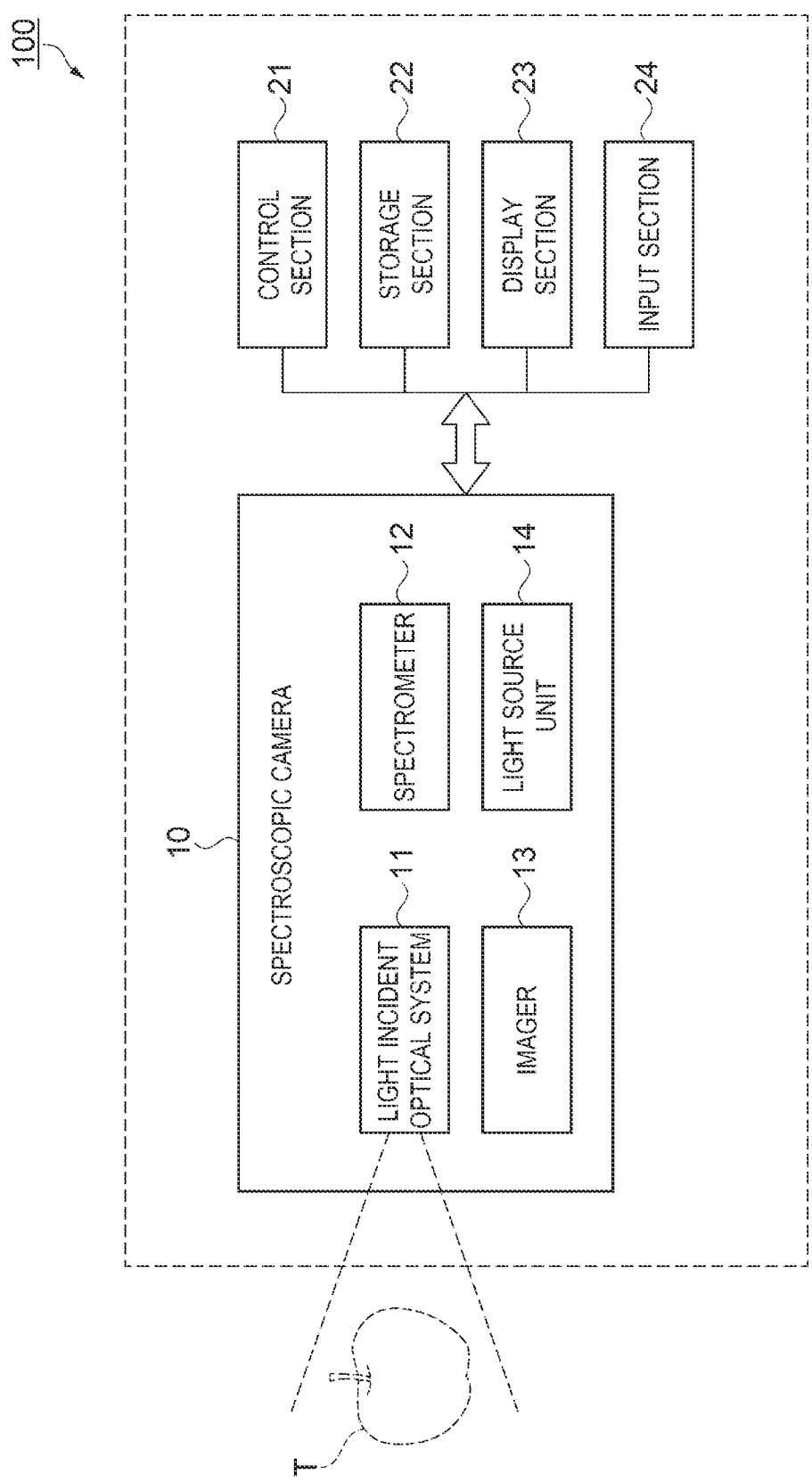
FIG. 3 is a block diagram showing the configuration of the smartphone.

The smartphone 100 includes the spectroscopic camera 10, a control section 21, which functions as a computer, a storage section 22 as a storage device, the display section 23, and the input section 24, as shown in FIG. 3.

The spectroscopic camera 10 includes a light incident optical system 11, the spectrometer 12 as a spectral filter, an imager 13, and a light source unit 14. The light incident optical system 11 includes, for example, an autofocus mechanism. The spectrometer 12 is, for example, a wavelength selective filter, specifically, a Fabry-Perot-type filter that can change the transmission wavelength band.

The imager 13 is, for example, a CCD (charge coupled device) and is an imaging device that photoelectrically converts the light passing through the spectrometer 12 to produce an electric signal representing the measurement target T and then digitizes the electric signal. The light source unit 14 irradiates the measurement target T with light.

The control section 21 includes one or more processors and operates in accordance, for example, with a control program stored as a computer program in the storage section 22 to oversee and control the action of the spectroscopic camera 10.

The storage section 22 includes a RAM (random access memory), a ROM (read only memory), and other memories. The RAM is used to temporarily store a variety of data and other pieces of information, and the ROM stores the control program, control data, and other pieces of information for controlling the action of the spectroscopic camera 10.

The display section 23 displays a variety of pieces of information on the screen thereof and includes, for example, a liquid crystal display, as described above.

The input section 24 is provided at the front surface of the display section 23 as described above, and accepts operation instructions inputted by a user (operator), that is, conditions under which unique spectral information on the measurement target T, and furthermore, a start signal that instructs the smartphone 100 to start image acquisition in the acquisition of the spectral information and other signals.

Figure 4:
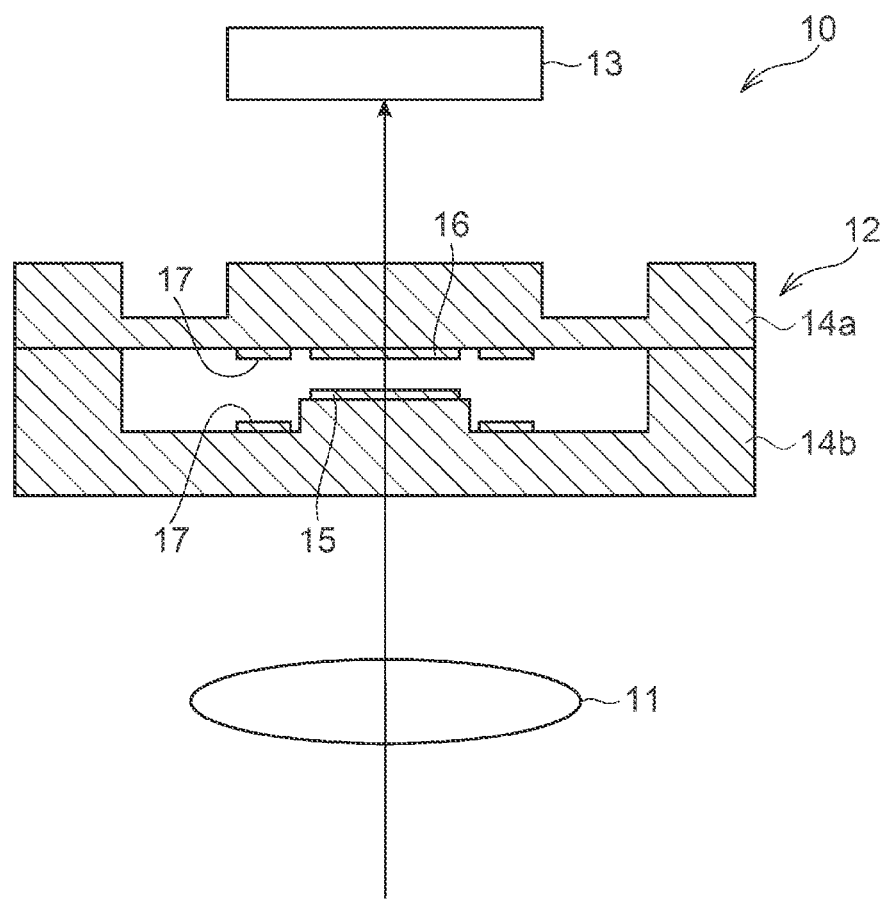
FIG. 4 shows the configuration of a spectroscopic camera.

The configuration of the spectroscopic camera 10 will next be described with reference to FIG. 4.

The spectroscopic camera 10 includes the light incident optical system 11, which external light enters, the spectrometer 12, which spectrally separates light incident thereon, and the imager 13, which captures the light spectrally separated by the spectrometer 12. The light incident optical system 11 is formed, for example, of a telecentric optical system, and guides the incident light to the spectrometer 12 and the imager 13 in such a way that the optical axis of the light incident optical system 11 and the chief ray of the incident light are parallel or substantially parallel to each other.

The spectrometer 12 is a wavelength tunable interference filter including a pair of substrates 14a and 14b, a pair of reflection films 15 and 16, which face each other, and a gap changer 17, which can change the dimension of the gap between the reflection films 15 and 16. The gap changer 17 is formed, for example, of an electrostatic actuator. A wavelength tunable interference filter is also called an etalon. The spectrometer 12 is disposed in the optical path of the light incident on the imager 13.

The spectrometer 12 changes the dimension of the gap between the reflection films 15 and 16 by changing a voltage applied to the gap changer 17 under the control of the control section 21 to change an output wavelength $\lambda i$ (i=1, 2, ..., N), which is the wavelength of light passing through the reflection films 15 and 16.

The imager 13 is a device that captures the light having passed through the spectrometer 12, and is formed, for example, of a CCD or a CMOS device. The spectroscopic camera 10 sequentially switches the wavelength of light to be spectrally separated by the spectrometer 12 under the control of the control section 21, captures the light having passed through the spectrometer 12 with the aid of the imager 13, and outputs captured image data, in other words, image frames.

The captured image data is data outputted for each of the pixels that form the imager 13 and representing the intensity of the light, that is, the amount of light received by the pixel.

The captured image data outputted by the spectroscopic camera 10 is stored in the storage section 22. The spectroscopic camera 10, which is a wavelength-scanning-type camera, can produce high-resolution captured image data as compared with captured image data produced by a wavelength-dispersion-type camera.

Figure 5:
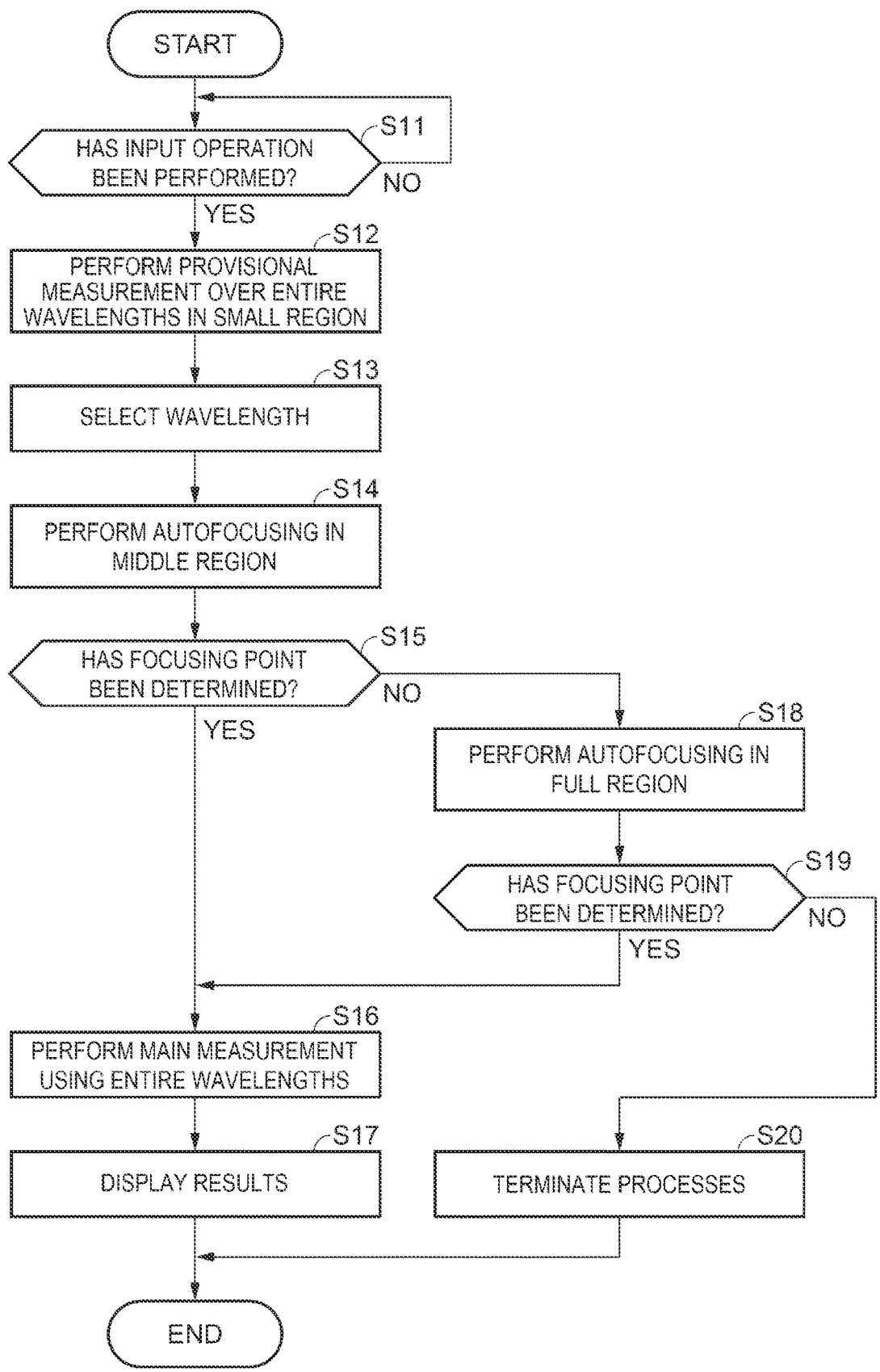
FIG. 5 is a flowchart showing an autofocusing method.
Figure 6:
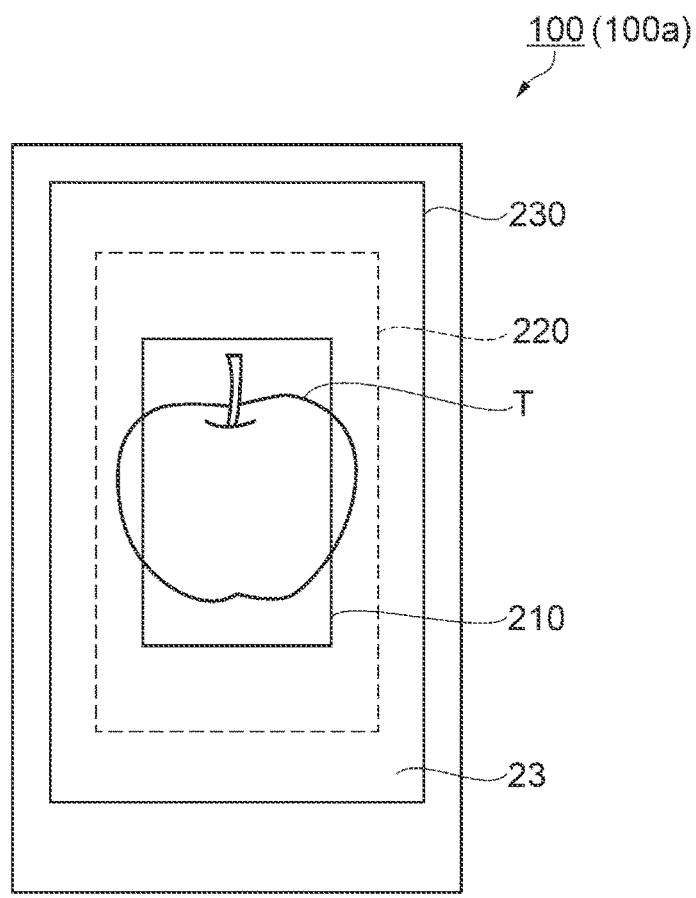
FIG. 6 describes part of the autofocusing method.
Figure 7:
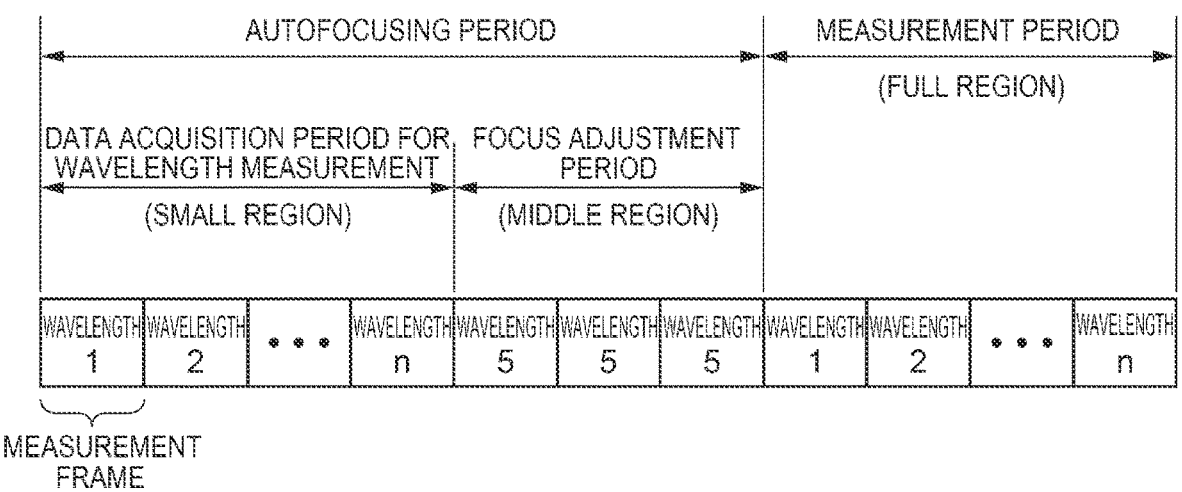
FIG. 7 is a timing chart showing the autofocusing method.

An autofocusing method executed by the spectroscopic camera 10 will next be described with reference to FIGS. 5 to 7. FIG. 5 is a flowchart showing the autofocusing method executed by the spectroscopic camera 10. FIG. 6 shows an example of the content displayed on the display section 23 in the autofocusing method. FIG. 7 is a timing chart showing the relationship between the measured frames, in other words, the image frames in the autofocusing period and the frames in the measurement period. Each step of the flowchart is executed by the control section 21.

First, in step S11, the control section 21 evaluates whether or not input operation has been performed on the smartphone 100, as shown in FIG. 5. Specifically, the input operation is, for example, operation of activating the spectroscopic camera 10, or operation of touching a small region 210 as a first region shown at the center of the display section with a finger or a touch pen in the state in which the spectroscopic camera 10 has been activated. When operation of specifying the small region 210 is inputted as described above, the control section 21 transitions to the process in step S12 and starts the procedure of the flowchart. When no such operation is inputted, the control section 21 repeats the process in step S11.

Regions displayed on the display section 23 will now be described with reference to FIG. 6. The regions displayed on the display section 23 include three types of regions: the small region 210; a medium region 220 as a second area wider than the small region 210; and a full region 230 as entire measurement pixels representing the entire surface of the display section 23, as shown in FIG. 6.

Specifically, the small region 210 is a region formed of two or more pixels but smaller than or equal to half of the full region 230. The medium region 220 contains the small region 210 and is larger than or equal to half of the full region 230 but smaller than or equal to three-quarters thereof.

The range of the small region 210 and the range of the medium region 220 may be set by an instrument, such as the smartphone 100, or the user may specify the position and range of the small region 210. The displayed small region 210 and medium region 220 may, for example, be accompanied by frame lines or colors so that the user can identify the regions.

Thereafter, in step S12, the control section 21 performs provisional measurement over the entire wavelengths in the small region 210, as shown in FIG. 5. Specifically, the control section 21 starts the provisional measurement in a data acquisition period for wavelength selection shown in FIG. 7 at the pixels of the imager 13 that are restricted to the small region 210. The provisional measurement is sequentially performed in the small region 210 n times, which is the maximum number of spectrometric operations performed by the spectrometer 12, for example, at a wavelength 1, a wavelength 2, ..., and a wavelength n, as shown in FIG. 7. That is, in the small region 210 out of the full region 230, the measurement is sequentially performed at each of the wavelengths greater than two until the n-th measurement, which is the maximum number of spectrometric operations performed by the spectrometer 12, is performed to acquire n image frames.

Thereafter, in step S13, the control section 21 selects a wavelength to be used for autofocusing, that is, focus adjustment. Specifically, from the n image frames acquired in the provisional measurement, the control section 21 selects a wavelength at which any of the average, median, and mode specified in advance by the user is maximized. In other words, the wavelength at which the contrast is maximized is selected. The selection is made from two or more but smaller than or equal to n−1 image frames. It is assumed in the present embodiment that the wavelength 5, for example, has been selected, as shown in FIG. 7.

A contrast ratio is defined as the ratio between a maximum output value and a minimum output value outputted from the image sensor, that is, the imager 13. When the difference in the contrast ratio between the wavelengths is small (in general, when the difference in the contrast ratio falls within a range of ±10), the wavelength to be selected is a wavelength at which any of the average, median, and mode of the image data at each wavelength, in other words, a calculated histogram (horizontal axis: range of output from image sensor, such as 0 to 255, vertical axis: frequency) of the image data in the target region in an image frame is maximized. The user specifies the value to be used in the wavelength selection, the average, the median, or the mode.

The average is (class value×frequency)/(total frequency). The class value is the pixel value and is determined as the pixel values contained in a segment, for example, having a 5-to-255 width in one image frame outputted by the image sensor. The median is defined as the central value of the pixel values contained in one image frame outputted by the image sensor and sequentially arranged in the ascending or descending order. The mode is the pixel value of pixels that account for the largest portion of one image frame outputted by the image sensor.

Thereafter, in step S14, autofocusing is performed in the medium region 220, which is wider than the small region 210. Specifically, the selected wavelength 5 is used to perform contrast-based autofocusing in a focus adjustment period shown in FIG. 7. That is, light having the selected wavelength (specifically, wavelength 5) is caused to pass through the spectral filter, and the image sensor receives the light having passed through the spectral filter to determine a focusing point.

A lens in the spectroscopic camera 10 is moved in the direction of the optical axis of the lens, for example, by a voice coil motor (VCM) built into the spectroscopic camera 10 to determine the contrast at each position, and the position where the contrast is maximized is determined as the focusing point. The contrast at this point is calculated in the medium region 220. The reason for this is that when the calculation is made in the full region 230, where the amount of data is large, it takes time to complete the calculation, and the region where the calculation is made is therefore narrowed to the medium region 220 to reduce the period required for the autofocusing.

Thereafter, in step S15, the control section 21 evaluates whether or not the focusing point has been determined, in other words, evaluates whether or not the focusing point has been found. When the focusing point is determined, information on the focusing point is stored in the storage section 22, and the control section 21 proceeds to the process in step S16. When the focusing point is not found, the control section 21 proceeds to the process in step S18.

In step S18, the region where the calculation is made is expanded from the medium region 220 to the full region 230, and the contrast is calculated, in other words, the autofocusing is performed, or the focusing point is determined. Specifically, the contrast is not correctly provided in the medium region 220 depending on the measurement target T, and the contrast is therefore calculated by expanding the region where the calculation is made to the full region 230.

In step S19, the control section 21 evaluates whether or not the focusing point has been determined, in other words, whether or not the focusing point is found. When the focusing point has been found, the control section 21 proceeds to the process in step S16. When the focusing point has not been found, the control section 21 proceeds to the process in step S20 and notifies the user that no focusing point has been found.

At this point, the user, for example, causes a light source built into the smartphone 100 to radiate light onto the measurement target T, or adjusts the measurement angle and other factors to attempt to achieve optimal contrast. Thereafter, the autofocusing method and other processes may be carried out again.

In step S16, after the focusing point is found, main measurement is performed in the full region 230. Specifically, in the measurement period, the main measurement, which is scanning the wavelength from the wavelength 1 to the wavelength n, is performed, as shown in FIG. 7.

In step S17, the control section 21 displays results of the main measurement. Specifically, for example, when the measurement target T is a piece of fruit, the color, sugar content, foreign matter contamination, and other parameters are analyzed, and results of the analysis are displayed on the display section 23. The entire procedure is then terminated.

As described above, the autofocusing method according to the present embodiment includes causing light having n wavelengths different from one another to sequentially pass through the spectrometer 12 and acquiring n image frames corresponding to the n wavelengths, n being an integer greater than or equal to two, selecting a wavelength corresponding to an image frame having the largest statistical value from the n image frames, the statistical value being one of the average, median, and mode of the class values of the pixels contained in the small region 210 out of the full region 230 in each of the image frames, and determining a focusing point in the medium region 220, which is wider than the small region 210, out of the full region 230 while causing the light having the selected wavelength to pass through the spectrometer 12.

According to the method described above, a wavelength at which any of the average, median, and mode is maximized, that is, a wavelength at which the contrast is maximized is selected in the small region 210 out of the full region 230, and the focusing point is determined in the medium region 220, which is wider than the small region 210, whereby the focusing point can be determined in a short period as compared with the related-art method for selecting a wavelength at which the contrast is maximized in the full region 230.

In the autofocusing method according to the present embodiment, it is preferable that the wavelength at which the contrast is maximized is selected from two or more but smaller than or equal to n−1 image frames.

According to the method described above, an image frame in which the contrast is maximized is selected from the aforementioned number of image frames, whereby an optimal focusing point can be determined without being affected by the color of the subject.

In the autofocusing method according to the present embodiment, it is preferable that the small region 210 is a region formed of two or more pixels but smaller than or equal to half of the full region 230.

According to the method described above, the small region 210 falls within the range described above, whereby an optimum wavelength can be selected in a shorter period than in the case where the full region 230 is used as in the related art.

In the autofocusing method according to the present embodiment, it is preferable that the medium region 220 contains the small region 210 and is a region larger than or equal to half of the full region 230 but smaller than or equal to three-quarters thereof.

According to the method described above, the medium region 220 falls within the range described above, whereby the focusing point can be determined in a shorter period than in the case where the full region 230 is used to determine the focusing point as in the related art.

In the autofocusing method according to the present embodiment, when the focusing point is not determined in the medium region 220, it is preferable to determine the focusing point by expanding the region where the focusing point is determined from the medium region 220 to the full region 230.

According to the method described above, the focusing point is determined in the full region 230, whereby an optimum focusing point can be determined in accordance with the situation in which the method is used.

In the autofocusing method according to the present embodiment, it is preferable that the timing at which the focusing point is determined is the timing at which the small region 210 is specified.

According to the method described above, the autofocusing procedure starts when the small region 210 is specified, whereby the focusing point can be determined at an appropriate timing.

The spectroscopic camera 10 according to the present embodiment includes the spectrometer 12 and the control section 21, and the control section 21 carries out processes including causing light having n wavelengths different from one another to sequentially pass through the spectrometer 12 and acquiring n image frames corresponding to the n wavelengths, n being an integer greater than or equal to two, selecting a wavelength corresponding to an image frame having the largest statistical value from the n image frames, the statistical value being one of the average, median, and mode of the class values of the pixels contained in the small region 210 of full region 230 in each of the image frames, and determining a focusing point in the medium region 220, which is wider than the small region 210, out of the full region 230 while causing the light having the selected wavelength to pass through the spectrometer 12.

According to the configuration described above, a wavelength at which any of the average, median, and mode is maximized, that is, a wavelength at which the contrast is maximized is selected in the small region 210 out of the full region 230, and the focusing point is determined in the medium region 220, which is wider than the small region 210, whereby the focusing point can be determined in a short period as compared with the related-art method for selecting a wavelength at which the contrast is maximized in the full region 230.

A computer program according to the present embodiment is a computer program that performs autofocusing and includes causing light having n wavelengths different from one another to sequentially pass through the spectrometer 12 and acquiring n image frames corresponding to the n wavelengths, n being an integer greater than or equal to two, selecting a wavelength corresponding to an image frame having the largest statistical value from the n image frames, the statistical value being one of the average, median, and mode of the class values of the pixels contained in the small region 210 out of the full region 230 in each of the image frames, determining a focusing point in the medium region 220, which is wider than the small region 210, out of the full region 230 while causing the light having the selected wavelength to pass through the spectrometer 12, and storing the focusing point in the storage section 22.

According to the computer program described above, a wavelength at which any of the average, median, and mode is maximized, that is, a wavelength at which the contrast is maximized is selected in the small region 210 out of the full region 230, and the focusing point is determined in the medium region 220, which is wider than the small region 210, whereby the focusing point can be determined in a short period as compared with the related-art method for selecting a wavelength at which the contrast is maximized in the full region 230.

A variation of the embodiment described above will be described below.

The autofocusing method according to the embodiment described above is not necessarily applied to the smartphone 100 equipped with the spectroscopic camera 10, and may also be applied, for example, to a colorimeter, a spectroscope, an image formation apparatus with a built-in colorimeter, an optical sensor medical instrument, and a mobile instrument.

What is claimed is:

1. An autofocusing method comprising:
   causing light having n wavelengths different from one another to sequentially pass through a spectral filter and acquiring n image frames corresponding to the n wavelengths, n being an integer greater than or equal to two;
   selecting a wavelength corresponding to the image frame having the largest statistical value from the n image frames, the statistical value being one of an average, a median, and a mode of class values of pixels contained in a first region out of entire measurement pixels in each of the image frames; and
   determining a focusing point in a second region wider than the first region out of the entire measurement pixels while causing light having the selected wavelength to pass through the spectral filter.

2. The autofocusing method according to claim 1, wherein the wavelength at which the statistical value is maximized is selected from two or more but smaller than or equal to n−1 image frames.

3. The autofocusing method according to claim 1, wherein the first region is a region formed of two or more pixels but smaller than or equal to half of the entire measurement pixels.

4. The autofocusing method according to claim 1, wherein the second region contains the first region and is a region formed of pixels greater than or equal to half of the entire measurement pixels but smaller than or equal to three-quarters thereof.

5. The autofocusing method according to claim 1, wherein when the focusing point is not determined in the second region, the focusing point is determined by expanding the region where the focusing point is determined from the second region to the entire measurement pixels.

6. The autofocusing method according to claim 1, wherein a timing at which the focusing point is determined is a timing at which the first region is specified.

7. A spectroscopic camera comprising:
a spectral filter; and
a control section,
wherein the control section carries out processes including causing light having n wavelengths different from one another to sequentially pass through a spectral filter and acquiring n image frames corresponding to the n wavelengths, n being an integer greater than or equal to two,
selecting a wavelength corresponding to the image frame having the largest statistical value from the n image frames, the statistical value being one of an average, a median, and a mode of class values of pixels contained in a first region out of entire measurement pixels in each of the image frames, and
determining a focusing point in a second region wider than the first region out of the entire measurement pixels while causing light having the selected wavelength to pass through the spectral filter.

8. A non-transitory computer-readable medium storing a computer program that performs autofocusing, the computer program comprising:
causing light having n wavelengths different from one another to sequentially pass through a spectral filter and acquiring n image frames corresponding to the n wavelengths, n being an integer greater than or equal to two;
selecting a wavelength corresponding to the image frame having the largest statistical value from the n image frames, the statistical value being one of an average, a median, and a mode of class values of pixels contained in a first region out of entire measurement pixels in each of the image frames;
determining a focusing point in a second region wider than the first region out of the entire measurement pixels while causing light having the selected wavelength to pass through the spectral filter; and
storing the focusing point in a storage device.

* * * * *